US011397828B2

(12) United States Patent
Hungate et al.

(10) Patent No.: US 11,397,828 B2
(45) Date of Patent: *Jul. 26, 2022

(54) SYSTEM AND METHOD FOR FACILITATING ACCESS TO A DATABASE

(71) Applicant: SIMPLIFEYE, INC., New York, NY (US)

(72) Inventors: Ryan Hungate, Kokomo, IN (US); Zach Hungate, Lakewood Ranch, FL (US)

(73) Assignee: SIMPLIFEYE, INC., New York, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/845,282

(22) Filed: Apr. 10, 2020

(65) Prior Publication Data

US 2020/0242271 A1 Jul. 30, 2020

Related U.S. Application Data

(63) Continuation of application No. 15/223,046, filed on Jul. 29, 2016, now Pat. No. 10,650,162.

(Continued)

(51) Int. Cl.
*G06F 21/62* (2013.01)
*H04W 4/33* (2018.01)
(Continued)

(52) U.S. Cl.
CPC .......... *G06F 21/6245* (2013.01); *G06F 3/167* (2013.01); *G06F 21/604* (2013.01);
(Continued)

(58) Field of Classification Search
CPC .... G06F 21/6245; G06F 3/167; G06F 21/604; H04W 4/33; H04W 4/021; H04W 4/029;
(Continued)

(56) References Cited

U.S. PATENT DOCUMENTS 6,724,403 B1 4/2004 Santoro et al.
6,999,930 B1 2/2006 Roberts et al.
(Continued)

OTHER PUBLICATIONS

Favela, Integrating Context-Aware Public Displays Into A Mobile Hospital Information System, IEEE Transactions On Information Technology In Biomedicine, Sep. 2004, vol. 8 No. 3, pp. 279-286.
(Continued)

*Primary Examiner* — Evan Aspinwall
(74) *Attorney, Agent, or Firm* — Dinsmore & Shohl LLP (57) ABSTRACT

A system and method for facilitating access to requested information in building. The system includes a database, a server having a central processing unit, a wireless network, video displays disposed in rooms, and a sensing unit in communication with the server over the wireless network. The sensing unit has a microphone and disposed in each of the rooms. The sensing units are configured to detect the presence of a user and actuate an associated video display. The microphone is configured to receive requested information from the user. The central processing unit processes the requested information so as to retrieve the requested information from the database and display the requested information on the associated video display. In one embodiment, the sensing unit is a beacon and a portable electronic device. In another embodiment, the sensing unit is a wireless voice command device.

20 Claims, 5 Drawing Sheets

Related U.S. Application Data (60) Provisional application No. 62/198,219, filed on Jul. 29, 2015.

(51) Int. Cl.
*H04W 4/021* (2018.01)
*G06F 3/16* (2006.01)
*G06F 21/60* (2013.01)
*G10L 25/57* (2013.01)
*G10L 15/22* (2006.01)

(52) U.S. Cl.
CPC .............. *G10L 25/57* (2013.01); *H04W 4/021* (2013.01); *H04W 4/33* (2018.02); *G10L 2015/223* (2013.01)

(58) Field of Classification Search
CPC ..... H04W 4/30; H04W 64/00; H04W 64/003; H04W 40/244; H04W 4/025; G10L 25/57; G10L 2015/223
USPC .......................................................... 707/781
See application file for complete search history.

(56) References Cited

U.S. PATENT DOCUMENTS

| | | | |
|---|---|---|---|
| 7,613,478 B2 | 11/2009 | Jabri et al. | |
| 7,865,211 B2 | 1/2011 | Jabri et al. | |
| 8,022,894 B2 | 9/2011 | Naito et al. | |
| 8,035,685 B2 | 10/2011 | Jensen | |
| 8,132,217 B2 | 3/2012 | Miyata | |
| 8,200,184 B2 | 6/2012 | Hamada et al. | |
| 8,238,938 B2 | 8/2012 | Panabaker et al. | |
| 8,423,081 B2 | 4/2013 | Jabri et al. | |
| 8,774,145 B2 | 7/2014 | Lin et al. | |
| 8,781,502 B1* | 7/2014 | Middleton | G06F 8/65 455/456.3 |
| 8,923,839 B2 | 12/2014 | Park | |
| 8,924,594 B2 | 12/2014 | Manges | |
| 9,119,031 B2 | 8/2015 | Manges | |
| 9,153,199 B2 | 10/2015 | Tsukamoto et al. | |
| 10,567,920 B1* | 2/2020 | Goldman | H04L 61/6022 |
| 2002/0046207 A1 | 4/2002 | Chino et al. | |
| 2007/0281745 A1 | 12/2007 | Parkulo et al. | |
| 2009/0150156 A1 | 6/2009 | Kennewick et al. | |
| 2010/0130128 A1* | 5/2010 | Liao | H04W 24/00 455/41.2 |
| 2011/0093271 A1 | 4/2011 | Bernard | |
| 2013/0293373 A1* | 11/2013 | Gegner | G08B 25/00 340/527 |
| 2014/0047072 A1 | 2/2014 | Shuster | |
| 2014/0191868 A1 | 7/2014 | Ortiz et al. | |
| 2014/0229852 A1 | 8/2014 | Lee | |
| 2014/0379587 A1 | 12/2014 | Thomson et al. | |
| 2015/0039422 A1 | 2/2015 | Abraham et al. | |
| 2015/0062048 A1 | 3/2015 | Park et al. | |
| 2015/0206533 A1 | 7/2015 | Jin et al. | |
| 2015/0262269 A1 | 9/2015 | Zamer | |
| 2016/0093304 A1* | 3/2016 | Kim | G10L 17/26 704/235 |
| 2017/0213445 A1* | 7/2017 | Kusens | G08B 25/016 |

OTHER PUBLICATIONS

Bardram et al., Article: "Context-Aware User Authentication—Supporting Proximity-Based Login in Pervasive Computing", A.K. Dey et al. (Eds.): UbiComp 2003, LNCS 2864, pp. 107-123, 2003, Sprinter-Verlag Berlin Heidelberg 2003. (Year: 2003).

\* cited by examiner

SYSTEM AND METHOD FOR FACILITATING ACCESS TO A DATABASE

CROSS-REFERENCE TO RELATED APPLICATIONS

This application is a continuation of U.S. patent application Ser. No. 15/223,046 filed Jul. 29, 2016, which in turn claims priority of U.S. Provisional Application No. 62/198,219 filed Jul. 29, 2015, the contents of both which are incorporated herein by reference.

BACKGROUND OF THE INVENTION

Businesses with large workspaces having multiple offices, rooms or workstations often issue portable electronic devices to their employees to facilitate the access of information from a central database. However, the viewing space of such portable electronic devices is limited and thus facilitation of a discussion may be better served by viewing the information on a larger screen such as a standard video display for a desktop computer or a stand-alone video display configured to receive and process data. However, utilizing a desktop computer reduces personal interaction between employees or agents as the personal interface is disrupted by one employee engaging the keyboard. Accordingly, it remains desirable to have a system wherein the employees may maintain visual face-to-face communication without having to turn their backs on each other to access the database through a desktop computer.

SUMMARY OF THE INVENTION

A system and method for facilitating the access of information from a database while maximizing face-to-face time between employees and/or clients is provided. The system may be implemented in a large building having multiple rooms or workstations. The system includes video displays and a server connected to the video displays. The server includes a central processing unit linked to the video displays over a wireless network. The system includes a sensing unit configured to detect a user. The central processing unit is configured to process a detection of a user with a location of a video display so as to automatically actuate the video display closest to the user, wherein the user may command the system to display requested information on the actuated video display.

In one embodiment of the system, the sensing unit is a beacon. The system includes a plurality of beacons fixed throughout the rooms/workstations of the building. The beacons are programmed with its location within the building. The system further includes a plurality of beacons and a portable electronic device. The portable electronic devices are linked to the server over a wireless network. The beacons are configured to emit a wireless signal configured to carry its location. The portable electronic devices may be associated with employees.

The portable electronic device is configured to access a database. The portable electronic device is further configured to process the signals from each of the beacons so as to provide its location within the building. The location of the portable electronic device and the information requested from the portable electronic device are transmitted wirelessly to the server.

The server has a central processing unit which determines an associated video display. In some instances, the associated video display is the nearest video display within the room/workstation the portable electronic device is located. In other instances, the display priority segment will make a determination of the associated video display based upon the location of the user, the amplitude of the auditory signal, and/or the map. The central processing unit retrieves the requested information from the database and pushes the requested information onto the associated video display The portable electronic device may be equipped with voice recognition software so as to allow the user to pull information using a predetermined language protocol. The information is transmitted to the central processing unit over a wireless network. The central processing unit processes the request and pushes the information onto the associated video display so as to allow the information to be seen easily relative to displays on portable handheld devices.

In another embodiment of the system, the sensing device is a wireless voice command device. The system includes a plurality of wireless voice command devices fixed throughout the rooms/workstations of the building. The wireless voice command device may include a speaker and directional microphone.

The server has a central processing unit which activates an associated video display. The voice command device may be equipped with voice recognition software so as to allow the user to pull information using a predetermined language protocol. The microphone receives the verbal request from the user. The requested information is transmitted to the central processing unit over a wireless network. The central processing unit processes the request and pushes the information onto the associated video display so as to allow the information to be seen easily relative to displays on portable handheld devices.

Accordingly, the system enables the user to access information from the database without having to turn his/her back to the other person to use a keyboard. The user may simply request information from the database using a portable electronic device or a wireless voice command device so as to maintain face-to-face communication with another employee or a client.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

A system and method for use in a building having multiple rooms or workstations configured to push requested information to an adjacent video display so as to facilitate access of a database while maintaining face-to-face contact with another employee, agent or a client (collectively or individually referenced herein as ⬜employee⬜) is provided.

The system includes video displays and a server connected to the video displays. The server includes a central processing unit linked to the video displays over a wireless network. The system includes a sensing unit configured to detect a presence of a user. The central processing unit is configured to process a detection of a user with a location of a video display so as to automatically actuate the video display closest to the user, wherein the user may command the system to display requested information on the actuated video display. Accordingly, the user may simply walk into a room and have information automatically displayed on a video display in the same room by a verbal command. Thus, users may spend more time interacting with clients as opposed to manipulating a portable electronic device.

With reference now to FIG. 1, a system 10 for facilitating access of a database 12 by pushing information verbally requested by a user 400 onto an adjacent video display 14 is provided. The database 12 may be populated with information relating to the operation of the building 500 in which the system 10 resides. For instance, in hospital buildings, the database 12 may be populated with patient information, a register of doctors and care takers, an inventory of medical supplies and the like. In industrial buildings, the database 12 may be populated with inventory of parts, specifications for parts, assembling information and the like.

The system 10 includes video displays 14 and a server 16 connected to the video displays 14. The server 16 includes a central processing unit 18 linked to the video displays 14 over a wireless network 20. The system 10 includes a sensing unit 22 configured to detect a user 400 within a predetermined range, and a microphone 22a for receiving verbal commands. The microphone 22a may be disposed in the sensing unit 22, or may be remote of the sensing unit 22 and connected to the sensing unit 22 by wire or over a short range wireless network such as Bluetooth® or WiFi®. The central processing unit 18 is configured to process a detection of a user 400 with a location of a video display 14 so as to automatically actuate the video display 14 closest to the user 400, wherein the user 400 may issue a verbal command to the system 10 to display requested information on the actuated video display 14.

In one embodiment, illustratively shown in FIG. 1, the sensing unit 22 is a plurality of beacons 24 and a portable electronic device 26. As used herein a beacon 24 refers to a device configured to provide the portable electronic device 26 with its location. The beacon 24 may transmit a signal carrying the location of the beacon 24. The signals are received by the portable electronic device 26 and the location of the beacons 24 are processed such that the portable electronic device 26 can determine its own location within the room the beacons 24 are located.

The portable electronic device 26 is further programmed to execute functions based upon a language protocol 28 which may be programmed, written or downloaded onto the portable electronic device 26 wherein the user 400 may request information from the database 12 using the language protocol 28. Alternatively, the language protocol may be on a remote server 16 such as a cloud 38, wherein the verbal command is processed by the language protocol 28 resident in the cloud 38 is processed by a processing unit of the cloud 38 and the cloud 38 instructs the video display 14. The information and the location of the portable electronic device 26 are transmitted to the server 16 over the wireless network 20. The wireless network 20 may be a wireless local area network using 2.4 gigahertz or 5 gigahertz radio bands. It should that the frequencies are provided for illustrative purposes only and are not limiting to the scope of the appended claims, and any frequency used today or later developed may be adapted for use herein. The location of the portable electronic device 26 is processed by the central processing unit 18.

The central processing unit 18 determines an associated video display 14. In some instances, the associated video display is the nearest video display 14 within the room/workstation 500a the portable electronic device 26 is located. In other instances, a determination of the associated video display 14 is based upon the location of the user 400, the map 34 and/or zone 42.

For illustrative purposes, the system 10 is shown implemented in a hospital building. However, it should be appreciated that the system 10 may be implemented in other buildings where a user 400 must interact with other employees or clients in different rooms/workstations 500a. For instance, it should be appreciated that the system 10 may be implemented in a manufacturing warehouse wherein the video displays 14 are located at different workstations 500a. The system 10 enables a supervisor to go to each workstation 500a and still request information from the database 12 using the portable electronic device 26. The requested information is displayed on the video display 14 of the workstation 500a the portable electronic device 26 is located. However, for illustrative purposes, the discussion of the system 10 will be explained in a setting of a hospital building 500.

The beacons 24 are configured to provide a signal which provides the location of the beacon 24. The beacons 24 are fixed in place and thus it should be appreciated that the movement of a beacon 24 requires the system 10 to be updated so as to account for the new position. For illustrative purposes, the beacon 24 is shown as a wireless signal transmitter commonly referenced as an iBeacon. However, it should be appreciated that any other wireless signal transmitter may be used and adapted for use herein.

For illustrative purposes, the portable electronic device 26 is shown as one of either a mobile phone or a watch. However, the portable electronic device 26 may also be a wearable device such an eyeglass having an augmented reality function, any such eyeglass currently known or later developed may be adapted for use herein, illustratively including Google Glasses®, Microsoft Hololens® or the like. The portable electronic device 26 includes an internal processor 30 configured to process a signal from the beacons 24 to determine its location, receive a request for information from the user 400, and transmit the requested information to the central processing unit 18 over the wireless network 20.

The portable electronic device 26 is configured with a signal processing segment 32 for processing the signal received from a respective beacon 24. The signal carries the location of the beacon 24. It should be appreciated that the signal processing segment 32 may process multiple signals from multiple beacons 24 so as to triangulate its position. The location of the portable electronic device 26 may be transmitted to the central processing unit 18 over the wireless network 20.

The central processing unit 18 may plot the location of the portable electronic device 26 on a map 34 of the office building 500. It should be appreciated that the map 34 may be uploaded onto a database 12 accessible by the central processing unit 18. The map 34 may include the dimensions of each of the rooms 500a within the building 500, fixtures 502 within each room 500a and the floor plan of each floor in the building 500.

The portable electronic device 26 is further configured to receive a request for information from the user 400. The request may be transmitted to the portable electronic device 26 verbally so as to promote face-to-face interaction with a client/patient while simultaneously retrieving patient information. In such an embodiment, the portable electronic device 26 receives the request through the microphone 22a disposed in the portable electronic device, and processes the request and transmits the requested information to the central processing unit 18. It should be appreciated that the portable device 26 may be further configured to have a tactile input 22b configured to receive tactile input. The tactile input 22b may be a touchscreen keyboard or the like, and information requested by the user 400 may be requested vis-à-vis the tactile input 22b. Such an embodiment may be preferable where third parties not privy to doctor-client information are present in the room, in instances where verbal commands are not possible such as a user who is mute, or in instances where it is more convenient for the user to gather/enter information through a tactile input such as a swipe, a push or a digital keyboard. It should appreciated that the portable electronic device 26 may be configured to have both a microphone 22a and a tactile input 22b so as to allow the user to choose based upon various factors to include convenience, preference and patient privacy.

Figure 1A:
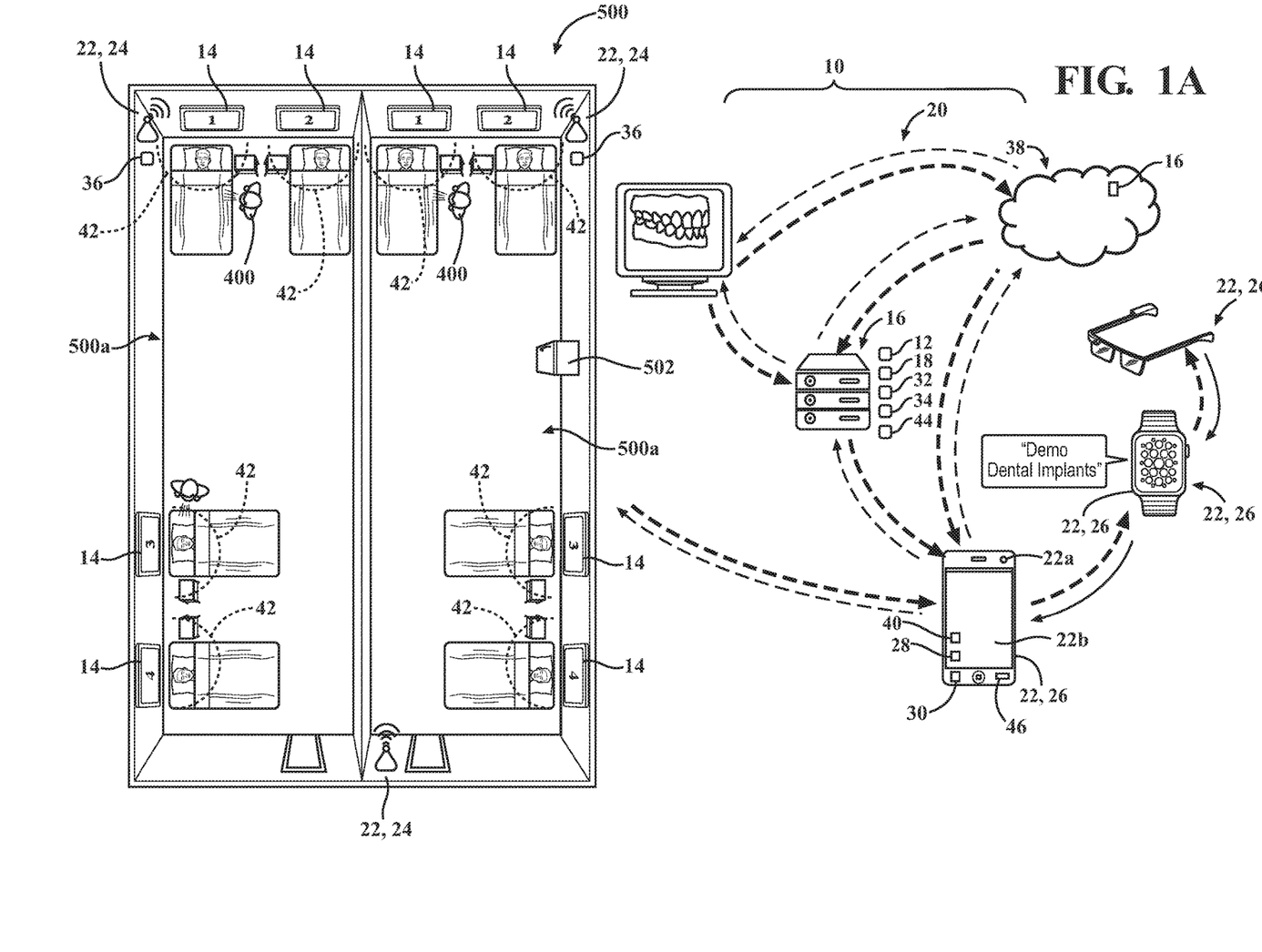
FIG. 1A is a schematic view of the system wherein the sensing unit includes a beacon and a portable electronic device according to one or more embodiments described herein.

FIG. 1A provides an illustrative example of a room 500a within the hospital building 500. As shown, the room 500a includes a video display 14. It should be appreciated that the system 10 includes a plurality of rooms 500a, each having at least one video display 14. The video displays 14 are preferably fixedly mounted in each room 500a. The video display 14 may include a motion sensor 36 monitoring a video display 14 to detect if the video display 14 has been moved. Thus, in the instance where a video display 14 is moved, the location of the video display 14 may be updated on the map 34. Thus, the user 400 may simply walk into a room 500a, request information through the portable electronic device 26 and have the requested information displayed on the video display 14 of the room 500a in which the request for information is being made.

FIG. 1A shows the system 10 being carried out over a wireless network 20, as indicated also by arrows between the server 16, the cloud 38, the video displays 14 and the sensing unit 22. The wireless network 20 may be a local network or may be internet enabled. The central processing unit 18 is configured to receive information from the portable electronic device 26 and is configured to identify which of the video displays 14 the portable electronic device 26 is located closest to. Accordingly, it should be appreciated that as a user 400, with a portable electronic device 26, moves from one room to another the portable electronic device 26 will determine its location based upon the beacons 24 fixedly disposed within the room 500a.

The portable electronic device 26 transmits its location to the central processing unit 18 wherein the central processing unit 18 processes the location and determines which of the video display devices is closest to the portable electronic device. Any request for information from the database 12 will be processed by the central processing unit 18, and a request for information from the database 12 will be made by the central processing unit 18 either through the wireless network 20, or through a wired/electrical connection. For instance, the central processing unit 18 and the database 12 may be housed on the same server 16. The central processing unit 18 retrieves the information and pushes the information onto video display 14 within the room either through the wireless network 20, or a wired connection.

Figure 1B:
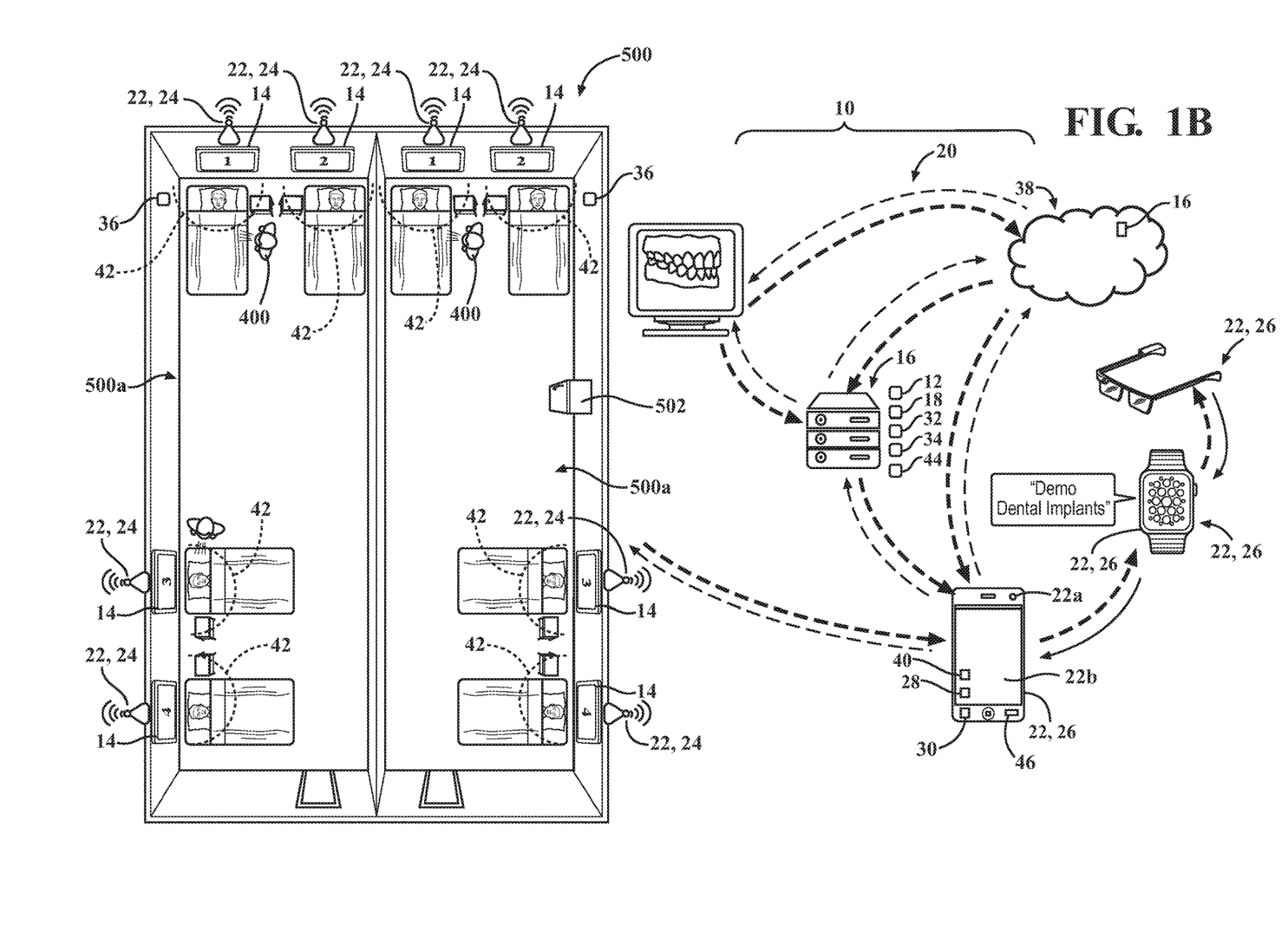
FIG. 1B is a schematic view of the system wherein the beacon is associated with a video display according to one or more embodiments described herein.

With reference now to FIG. 1B, an embodiment of the system 10 is provided wherein each video display 14 has a beacon 24. In such an embodiment, the beacons 24 transmit a signal. The portable electronic device 26 processes each of the signals received by a beacon 24 and determines which of the signals is the strongest. Each of the signals carry a beacon identifier, wherein the identification of the beacon with the strongest signal may be determined. The portable electronic device 26 transmits the identification of the beacon 24 with the strongest signal to the central processing unit 18, wherein the central processing unit 18 actuates the video display 14 associated with the beacon 24 having the strongest signal.

The system 10 may be configured to restrict access to the database 12. For instance each portable electronic device 26 must be registered with the central processing unit 18 so as to ensure that only authorized personnel may access the database 12. Alternatively, or additionally, the portable electronic device 26 may further include a recognition sensor 40 for sensing the identification of the user 400. Any recognition sensor 40 currently known and later developed may be adapted for use herein, illustratively include fingerprint swipes, retinal scans, voice recognition, and the like. The central processing unit 18 may be further configured to reject any user not authorized to access information from the database 12.

It should further be appreciated that the system 10 is implemented within a building 500 thus the beacons 24 and the video displays 14 are disposed within the coverage of a wireless network 20. Accordingly, the system 10 may include a plurality of repeaters configured to spread the wireless coverage throughout the entire building 500.

The map 34 of the office or the warehouse may further include a zone 42 (indicated by the dashed lines) surrounding each video display 14. For instance, the zone 42 may be the dimension of the room in which the video display 14 is disposed or alternatively, in instances where the system 10 is implemented in a manufacturing warehouse, the zone 42 may be a radius surrounding the video display 14. The zone 42 helps the central processing unit 18 decide which video display 14 to push the requested information onto. FIG. 1 shows an example of a zone 42 established around video displays 14 disposed within the same room 500a.

Thus, in instances where the system 10 is implemented in a warehouse having a manufacturing line with a plurality of workstations 500a sequentially arranged along the manufacturing line and the user 400 will receive information on a video display 14 in which the portable electronic device 26 is disposed within the zone of the video display 14. Accordingly, the information is always presented in a video display 14 which the user 400 has access to.

In an example of the system 10 being used in a hospital, the zone 42 is useful in ensuring the requested information is displayed in the appropriate room 500a. For instance, the user 400 might be physically located closer to a video display 14 in a different room 500a than the video display 14 in the room 500a the user 400 is located. However, the central processing unit 18 will process the location of the portable electronic device 26 along with the map 34 of the hospital and/or the zone 42 so as to display information on the video display 14 that may be further away from the closest video display 14 but in the same room 500*a* in which the portable electronic device 26 is located.

It should be appreciated that the video display 14 may also be disposed within a hallway of the hospital, or in an open space of an industrial complex, between various workstations 500*a*. In such an embodiment, a beacon 24 is also disposed in the hallway/open space wherein the portable electronic device 26 processes the signal from the beacon 24 to determine its location and transmits its location to the central processing unit 18. A request for information from the portable electronic device 26 is transmitted to the central processing unit 18 and the requested information is displayed on the video display 14 adjacent the beacon 24. Accordingly, the system 10 may provide information to the user 400 while the user 400 is moving from one place to another, or when the user 400 wants privacy.

The system 10 may be further equipped with a display priority segment 44. The display priority segment 44 is configured to allocate usage of a video display 14 based upon various factors such as priority of need or the capabilities of the portable electronic device 26. The display priority segment 44 may be useful in determining which of two users 400 located equal distance to the nearest video display 14 will get access to the video display 14. For instance, the display priority segment 44 may provide access to the video display 14 to the user 400 who has a handheld portable electronic device 26 embodied in a smart phone whereas the user 400 with a portable electronic device embodied in eye glasses with augmented reality will receive the requested information on the eye glasses with augmented reality.

In another embodiment, the display priority segment 44 may be configured to allocate usage of a video display 14 based upon determined protocols or artificial intelligence. In an example of artificial intelligence, the system 10 includes an artificial intelligence segment configured to learn behavioral patterns and preferences for individual users 400 and pushes requested information to a video display 14 based upon the preferences of the user 400. For instance, the requested information may be shown in a preferred font, or the video display 14 may be configured to have certain information displayed on the top portion of the video screen whereas other information may be displayed on the bottom portion of the video screen. Alternatively, certain information may be displayed on the portable electronic device 26 whereas other information may be displayed on the video display 14. Such a configuration may be desirable in instances where the user 400 wishes to protect private information.

The central processing unit 18 may be programmed to process a verbal request made in the language protocol 28 wherein the request for certain information may be displayed in a side-by-side manner on a single video display 14. Such a feature may be useful in instances where the physician would like to compare information from different files within the database 12. The physician may execute, through the language protocol 28, the retrieval of a patient s drug allergies and may also retrieve information about the patient ┌ s current drug schedule, different images such as an MRI or a CT scan. Thus, the physician can easily compare the two so as to ensure the patient is being medicated, diagnosed or treated properly, as the case may be. It should also be appreciated that once the central processing unit 18 pushes the information onto the video display 14 that in cases where the video display 14 is linked to a desktop computer the command functions of the desktop computer such as the keyboard and mouse may be used to navigate through the information.

In another illustrative example of competing video display space, the display priority segment 44 is configured to detect when a portable electronic device 26 is configured to receive a visual display and when one is not. This may be helpful in an instance where two physicians are in the same room treating two different patients. In instances where one physician is equipped with a portable electronic device 26 having a display, such as Google glasses and the other physician is equipped with portable electronic device 26 that does not have a display, such as a portable electronic device 26 in the form of a wrist band, the display priority segment 44 displays requested information on the video display 14 based upon the capabilities of the portable electronic device 26 making the request for information. Thus, the display priority segment 44 may push information requested by physician wearing Google glasses, Google glasses pushes the requested information onto the heads up display of Google glasses whereas the information requested by the physician wearing a band is pushed onto the video display 14 in the room 500*a*.

The portable electronic device 26 may also include a data entry processing unit 46. The data entry processing unit 46 may be configured to enter information spoken by the user 400 into the database 12. In one example of the data entry processing unit 46, the data entry processing unit 46 processes verbal information from the user 400 through the language protocol 28 to enter information into various fields brought up in the video display 14. Accordingly, the user 400, who is a physician, may examine the patient and simultaneously enter information regarding the examination directly into the database 12, to include a summary of the examination, a list of prescription medication, patient progress and the like.

Figure 1C:
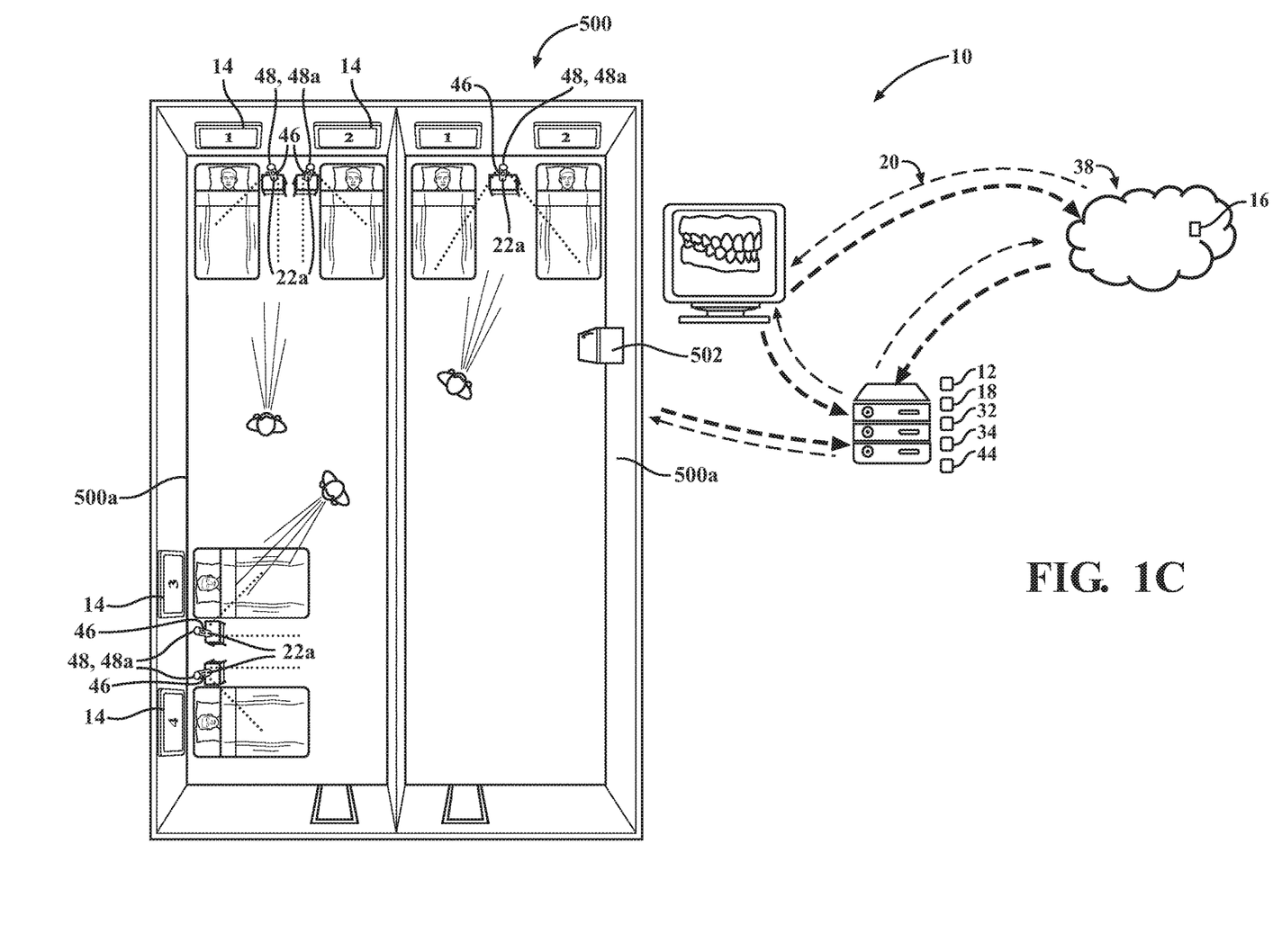
FIG. 1C is a schematic view of the system wherein the sensing unit is a wireless voice command device according to one or more embodiments described herein.

With reference now to FIG. 1C, an embodiment of the system 10 is provided wherein the sensing unit 22 is a wireless voice command device 48. The system 10 includes a plurality of wireless voice command devices 48 fixed throughout the rooms/workstations 500*a* of the building 500. The wireless voice command device 48 may include a speaker 48*a*. The microphone 22*a* is disposed within the wireless voice command device 48. The microphone 22*a* is directional so as to pick up auditory signals within a predetermined range. The wireless voice command device 48 is further configured to couple to the wireless network 20 through a wireless transceiver.

The wireless voice command device 48 may also include a data entry processing unit 46. The data entry processing unit 46 may be configured to enter information spoken by the user 400 into the database 12. In one example of the data entry processing unit 46, the data entry processing unit 46 processes verbal information from the user 400 through the language protocol 28 to enter information into various fields brought up in the video display 14. Accordingly, the user 400, who is a physician, may examine the patient and simultaneously enter information regarding the examination directly into the database 12, such as a summary of the examination, a list of prescription medication, patient progress and the like. It should be appreciated that the information for which the user 400 is provided herein for illustrative purposes and is not intended to limit the scope of the appended claims.

The server 16 has a central processing unit 18 which activates a video display 14 nearest a wireless voice command device 48. Any wireless voice command device 48 currently known or later developed may be adaptable for use herein, illustratively including the wireless voice command device commonly known as the Amazon Echo®. The wireless voice command device 48 may be equipped with voice recognition software so as to allow the user to pull information using a predetermined language protocol 28. It should be appreciated that the language protocol 28 may be resident in the wireless voice command device 48, cloud 38 or server 16. The microphone 22a receives the verbal request from the user 400. The requested information is transmitted to the central processing unit 18 over the wireless network 20. The central processing unit 18 processes the request and pushes the information onto the video display 14 nearest the wireless voice command device 48 so as to allow the information to be seen easily relative to displays on portable handheld devices.

In one embodiment, each room 500a has a video display 14 and a wireless voice command device 48. In such an embodiment, the user 400, such as a physician, may simply enter the room 500a and issue a verbal request. The verbal request is detected by the wireless voice command device 48 and transmitted to the server 16, wherein the information requested is displayed on the adjacent video display 14.

In yet another embodiment of the system 10 having a wireless voice command device 48, the display priority segment 44 is configured to process the amplitude of the signal received by wireless voice command devices 48 competing for the same video display 14. Such a display priority segment 44 is useful in systems where multiple wireless voice command devices 48 and video displays 14 are located in a common room 500a. The display priority segment 44 is configured to determine which of the video displays 14 is actuated based upon the strength of a signal received by the wireless voice command devices 48 within the room 500a. For example, each of the wireless voice command devices 48 is equipped with a microphone 22a. The microphone 22a may be a directional microphone 22a and oriented so as to pick up noise directed towards a video display associated with the wireless command device 48. A user entering the room 500a may issue a verbal request for information using the language protocol 28. In certain situations, all of the wireless voice command devices 48 may detect the verbal request. The wireless voice command devices 48 transmit the verbal request to the central processing unit 18, wherein the display priority segment 44 processes the amplitude of each signal from a respective wireless voice command device 48 to determine which of the signals has the greatest amplitude. The central processing unit 18 actuates the video display 14 associated with the wireless command device 48 transmitting the greatest signal amplitude.

In one embodiment, shown on the right side of the building depicted in FIG. 1C the system 10 includes a single wireless voice command device 48 disposed in a room 500a with at least two video displays. In such an embodiment, the display priority segment 44 is configured to process the amplitude of the signal received by wireless voice command device 48 so as to determine which of video display 14 within the room 500a should be actuated. The display priority segment 44 may include logic configured to process the amplitude and the orientation of the directional microphone 22a to determine the location of the user 400 issuing the verbal request, wherein the central processing unit 18 processes the location of the user 400 and the location of the video displays 14 so as to display the requested information on the video display 14 closest to the user 400. It should be appreciated that the embodiments described herein are provided for illustrative purposes and do not limit the scope of the appended claims. For instance, the system 10 may be configured such that each room 500a contains a single wireless voice command device 48 and a single video display 14. In such an embodiment, a display priority segment 44 is not required as the video display 14 is actuated by a simple verbal request picked up by the wireless voice command device 48.

Figure 1D:
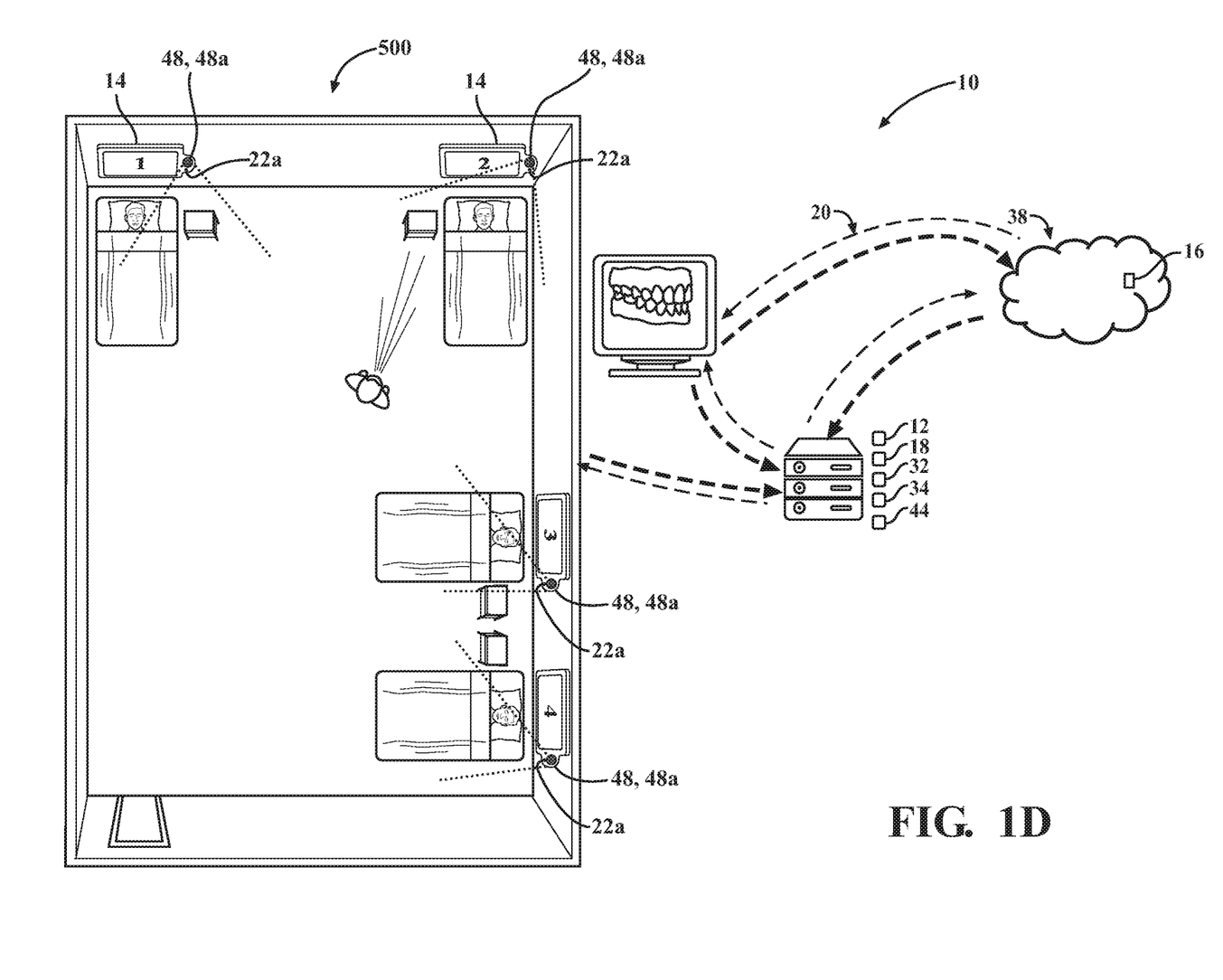
FIG. 1D is a schematic view of the system wherein the wireless voice command is integrated in the display according to one or more embodiments described herein.

With reference now to FIG. 1D, an embodiment of the system 10 is shown wherein the wireless command device 48 is integrated with the video display 14. The system 10 operates in the same manner as described above. Each of the video displays 14 includes a wireless voice command device 48 equipped with a microphone 22a. Preferably, the microphone 22a is a directional microphone so as to receive auditory signal within a predetermined range. In such an embodiment, the central processing unit 18 may be configured to actuate a video display 14 when an auditory signal is picked up by the microphone 22a.

Figure 2:
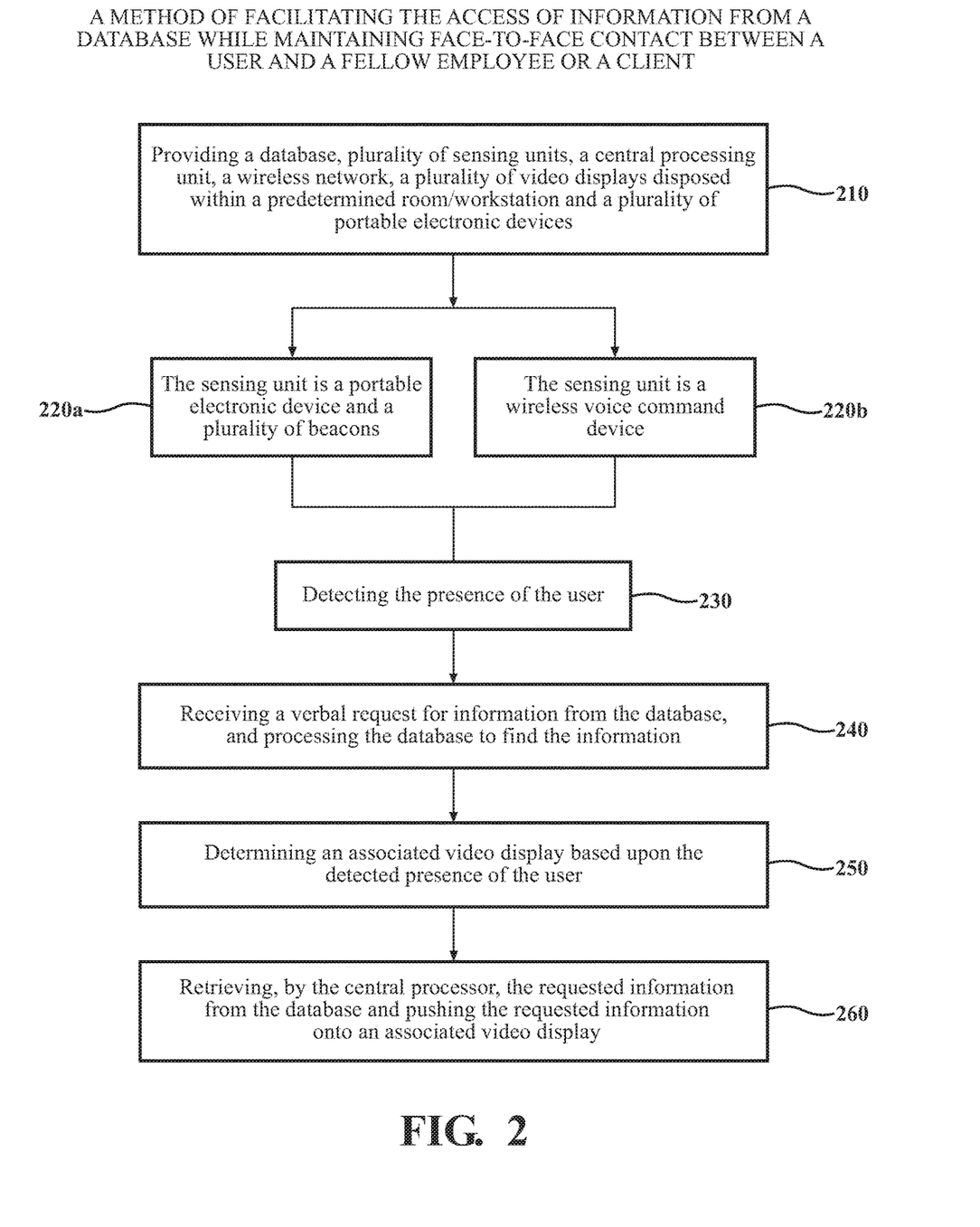
FIG. 2 is a diagram showing the method for facilitating access to a database using voice command devices according to one or more embodiments described herein.

With reference now to FIG. 2, a method 200 of facilitating the access of information from a database 12 while maintaining face-to-face contact between a user 400 and a fellow employee or a client is also provided. The method 200 may be executed in a building 500 having multiple rooms and/or workstations 500a. The method 200 includes step 210, providing a central processing unit 18, a wireless network 20 and a sensing unit 22. The sensing unit includes a microphone 22a. The method 200 includes the steps of providing a database 12, the database 12 is populated with information relating to the operation of the building 500 in which the system 10 resides. For instance, in hospital buildings, the database 12 may be populated with patient information. In industrial buildings, the database 12 may be populated with inventory, or assembling information.

In one embodiment of the method 200, the sensing unit 22 is a plurality of beacons 24 and a portable electronic device 26, as shown in step 220a. In another embodiment the sensing unit 22 is a wireless voice command device 48 as shown in step 220b.

The method includes step 230, detecting the presence of a user 400 using the sensing unit 22. The step of detecting the presence of the user 400 may be executed by a plurality of sensing units 22.

In step 220a wherein the sensing units 22 are a plurality of beacons 24 and a portable electronic device 26. Each of the beacons 24 is fixed within a respective room/workstation. A video display 14 is also disposed within a predetermined number of rooms/workstations. The beacons 24 are configured to provide a signal carrying the location of the beacon 24.

The portable electronic device 26 includes a microphone 22a and an internal processor 30 configured to process the signals from the beacon 24 so as to determine the location of the portable electronic device 26 within said room/workstation.

The portable electronic device 26 transmits its position to the central processing unit 18. The central processing unit 18 determines the nearest video display 14 within the room/workstation the portable electronic device 26 is located. The portable electronic device 26 is further configured to process a request for information from the user 400. Preferably, the request for information is received by the microphone using a language protocol 28.

Each of the beacons 24 is fixed in place within a respective room/workstation 500a/500b. The beacons 24 are configured to provide a signal carrying the location of the beacon 24. The portable electronic device 26 transmits the requested information to the central processing unit 18 which pulls the information from the database 12. The central processing unit 18 further pushes the requested information to the nearest video display 14 in the room/workstation the portable electronic device 26 is located.

The portable electronic devices 26 processing the signals from the beacon 24 so as to determine the location of the portable electronic device 26 within said room/workstation 500*a*. It should be appreciated that the video display 14 may be co-located within the workstation 500*a* of the personal portable electronic device 26 or may be located in an open space or between workstations 500*a* and adjacent the personal portable electronic device 26.

In step 220*b* wherein the sensing units 22 are a plurality of wireless voice command devices 48, the microphone 22*a* of a respective wireless voice command device 48 detects an auditory signal and the central processing unit 18 process the auditory signal so as to actuate a video display 14 associated with the wireless voice command device 48.

The method 200 includes step 240, receiving a verbal request for information from the user. The request for information being information stored in the database 12. The central processing unit 18 receives the requested information through the portable electronic device 26 wireless voice command device 48 and processes the database 12 for information. The microphone 22*a* is configured to receive the request from the user 400.

In step 250, the central processing unit 18 determines an associated video display 14. In some instances, the associated video display is the nearest video display 14 within the room/workstation 500*a* the portable electronic device 26 is located. In other instances, the display priority segment 44 will make a determination of the associated video display 14 based upon the location of the user 400/the amplitude of the auditory signal, and/or the map 34.

The method proceeds to step 260, having the central processing unit 18 retrieve the requested information from the database 12 and pushing the requested information onto the associated video display 14 located in the same room/workstation 500*a* as the portable electronic device 26. Preferably, the request for information is received by the microphone 22*a* using a language protocol 28.

The central processing unit 18 may be programmed to receive a language protocol 28 wherein the request for certain information may be displayed in a side-by-side manner on a single video display 14. Such a feature may be useful in instances where the employee would like to compare information from different files within the database 12. For instance, the physician may execute, through a language protocol 28, the retrieval of information related to the production of a part such as an image of the part and an inventory list, or the image of the part and a specification of the part. Thus, the user 400 can easily compare the two so as to ensure the part is being manufactured properly, or that the proper part is being manufactured.

While particular embodiments have been illustrated and described herein, it should be understood that various other changes and modifications may be made without departing from the spirit and scope of the subject matter. For instance, the system 10 has been described to facilitate face-to-face communication between multiple parties, but it should be appreciated that the system 10 may also help a single user 400 by allowing the single user 400 to access information in different workstations or offices. Moreover, although various aspects of the subject matter have been described herein, such aspects need not be utilized in combination.

We claim:

1. A system for facilitating access to information in a building having a plurality of rooms, the system comprising:
    a database;
    a server having a central processing unit;
    a wireless network;
    a plurality of video displays, each of the plurality of video displays disposed in the plurality of rooms;
    a plurality of spaced apart beacons, each of the beacons configured to provide a signal indicative of a location of the beacon; and
    a portable electronic device having a signal processing segment configured to process the signal received from each of the plurality of spaced apart beacons to triangulate a location of the portable electronic device,
    wherein the location of the portable electronic device is transmitted to the central processing unit via the wireless network to determine the location of the portable electronic device and actuate an associated video display of the plurality of video displays that is the closest in distance to the portable electronic device based on the triangulation of the portable electronic device using the beacons and the wireless network.

2. The system of claim 1, wherein each signal indicative of the location of the beacon of the plurality of spaced apart beacons has a unique identifier.

3. The system of claim 2, wherein the portable electronic device processes each signal indicative of the location of the each beacon of the plurality of spaced apart beacons and determines which signal from which beacon of the plurality of spaced apart beacons is a strongest signal.

4. The system of claim 3, wherein the portable electronic device transmits the unique identifier of the strongest signal of the beacon of the plurality of spaced apart beacons to the central processing unit.

5. The system of claim 4, wherein the central processing unit actuates the associated video display of the plurality of video displays associated with the unique identifier for the beacon with the strongest signal of the plurality of spaced apart beacons.

6. The system of claim 5, wherein:
    the portable electronic device further includes a microphone, wherein the microphone is configured to receive a requested information from a user based on a user's voice recognition that identifies a specific user, the central processing unit processing the requested information so as to retrieve the requested information from the database and automatically display the requested information on the associated video display in a predetermined preference based on the specific user as established by the user's voice recognition.

7. The system of claim 4, further including a map, the map downloaded onto the database, the map including a dimension of the building.

8. The system of claim 1, wherein the portable electronic device includes a recognition sensor configured to recognize an identity of the user, the central processing unit further configured to reject anyone not authorized to access information from the database.

9. The system of claim 2, further including a display priority segment, the display priority segment configured to allocate usage of the plurality of video displays based on a priority of need when more than one portable electronic device is an equal distance from the associated video display.

10. The system of claim 6, further including a data entry processing unit, the data entry processing unit configured to enter the requested information spoken by the user into the portable electronic device into the database.

11. The system of claim 1, wherein the plurality of beacons is a plurality of wireless voice command devices.

12. The system of claim 10, further including a display priority segment, the display priority segment configured to allocate usage of the plurality of video displays when at least two video displays of the plurality of video displays are in the same location as the portable electronic device.

13. A system for facilitating access to information in a building having a plurality of rooms, the system comprising:
   a database;
   a central processing unit;
   a wireless network;
   a plurality of video displays, each of the plurality of video displays disposed in the plurality of rooms;
   a plurality of spaced apart beacons, each of the beacons is configured to provide a signal indicative of a location of the beacon; and
   a portable electronic device having a signal processing segment and a microphone, the signal processing segment is configured to process the signal received from the plurality of beacons to triangulate a location of the portable electronic device and the microphone is configured to receive a requested information from a user based on a user's voice recognition that identifies a specific user,
   wherein the location of the portable electronic device is transmitted to the central processing unit via the wireless network to determine the location of the portable electronic device and wherein the central processing unit actuates an associated video display of the plurality of video displays that is the closest in distance to the portable electronic device based on the triangulation of the portable electronic device using the beacons and the wireless network and processes the requested information so as to retrieve the requested information from the database and automatically display the requested information on the associated video display.

14. The system of claim 13, wherein the requested information on the associated video display is displayed in a predetermined preference based on the specific user as established by the user's voice recognition.

15. The system of claim 13, wherein each signal indicative of the location of each beacon of the plurality of spaced apart beacons has a unique identifier.

16. The system of claim 15, wherein the portable electronic device processes each signal indicative of the location of each beacon of the plurality of spaced apart beacons and determines which signal from which beacon of the plurality of spaced apart beacons is a strongest signal.

17. The system of claim 16, wherein the portable electronic device transmits the unique identifier of the strongest signal of the beacon of the plurality of spaced apart beacons to the central processing unit.

18. The system of claim 17, wherein the central processing unit actuates the associated video display of the plurality of video displays associated with the unique identifier for the beacon with the strongest signal of the plurality of spaced apart beacons.

19. The system of claim 18, further including a map, the map downloaded onto the database, the map including a dimension of the building.

20. The system of claim 13, further including a display priority segment, the display priority segment configured to allocate usage of the plurality of video displays based on a priority of need when more than one portable electronic device is an equal distance from the associated video display and is configured to allocate usage of the plurality of video displays when at least two video displays of the plurality of video displays are in the same location as the portable electronic device.

* * * * *